United States Patent
Liu et al.

(10) Patent No.: US 10,989,930 B2
(45) Date of Patent: Apr. 27, 2021

(54) COLLIMATING LENS

(71) Applicant: JIANGXI LIANYI OPTICS CO., LTD., Nanchang (CN)

(72) Inventors: Xuming Liu, Nanchang (CN); Haojie Zeng, Nanchang (CN); Yumin Bao, Nanchang (CN); Weijian Chen, Nanchang (CN); Jiyong Zeng, Nanchang (CN)

(73) Assignee: JIANGXI LIANYI OPTICE CO., LTD., Nanching (CN)

( * ) Notice: Subject to any disclaimer, the term of this patent is extended or adjusted under 35 U.S.C. 154(b) by 0 days.

(21) Appl. No.: 16/326,378

(22) PCT Filed: Apr. 2, 2018

(86) PCT No.: PCT/CN2018/081612
§ 371 (c)(1),
(2) Date: Feb. 19, 2019

(87) PCT Pub. No.: WO2019/148639
PCT Pub. Date: Aug. 8, 2019

(65) Prior Publication Data
US 2020/0379269 A1 Dec. 3, 2020

(30) Foreign Application Priority Data
Jan. 30, 2018 (CN) .......................... 201810086735.9

(51) Int. Cl.
*G02B 27/30* (2006.01)
*G02B 3/04* (2006.01)

(52) U.S. Cl.
CPC ............... *G02B 27/30* (2013.01); *G02B 3/04* (2013.01)

(58) Field of Classification Search
CPC . G02B 27/30; G02B 3/04; G02B 3/02; G02B 7/028
(Continued)

(56) References Cited

U.S. PATENT DOCUMENTS

| 6,014,262 | A | * | 1/2000 | Noda | G02B 26/124 |
| | | | | | 359/205.1 |
| 6,396,640 | B2 | * | 5/2002 | Otomo | G02B 9/34 |
| | | | | | 359/205.1 |

(Continued)

FOREIGN PATENT DOCUMENTS

CN 107831630 A 3/2018

OTHER PUBLICATIONS

International Search Report issued in corresponding international application No. 2018081612, dated Oct. 10, 2018 (11 pages).

*Primary Examiner* — William R Alexander (57) ABSTRACT

The disclosure provides a collimating lens. In order from a laser transmitter side to a to-be-measured object side, the collimating lens includes a first lens, a second lens, a third lens, a fourth lens and an aperture stop. The aperture stop is on the to-be-measured object side, and optical centers of each lens being on a same line. The collimating lens satisfying the following conditions: $(dn/dt)1<-50\times10^{-6}/°\,C.$, $(dn/dt)2<-50\times10^{-6}/°\,C.$, $(dn/dt)3<-50\times10^{-6}/°\,C.$, $(dn/dt)4>-10\times10^{-6}/°\,C.$ A refractive index of each lens is usually distributed reasonably with temperature, the focal length can be stabilized and applied to different temperature occasion. Under the same size laser emitter, the focal length of the system is larger, and the field of view angle is smaller.

18 Claims, 9 Drawing Sheets

(58) Field of Classification Search
USPC .......................................................... 359/641
See application file for complete search history.

(56) References Cited

U.S. PATENT DOCUMENTS

| | | | |
|---|---|---|---|
| 2001/0043409 A1* | 11/2001 | Otomo | G02B 27/30 359/765 |
| 2018/0024334 A1* | 1/2018 | Asami | G02B 13/004 359/654 |
| 2020/0124825 A1* | 4/2020 | Liu | G02B 13/18 |
| 2021/0026155 A1* | 1/2021 | Liu | G02B 3/04 |

* cited by examiner

COLLIMATING LENS

CROSS-REFERENCE TO RELATED APPLICATION

This application claims priority to a Chinese patent application No. 2018100867359 filed on Jan. 30, 2018, titled "COLLIMATING LENS". The entirety of the above-mentioned application is hereby incorporated by reference herein.

TECHNIQUE FIELD

The present disclosure relates to a technical field of camera lenses, and particularly to a collimating lens.

BACKGROUND

With the rapid development of mobile phones, innovative technologies for the camera function of mobile phones continue to emerge, for example, the 3D imaging technology pushed by Apple inc. The 3D imaging technology is one kind of optical sensing technology based on 3D structured light. The 3D imaging technology can be used for face recognition, gesture recognition and camera function enhancement. The 3D imaging technology can also be used for developing new applications for augmented reality (AR) and transforming optical images from two-dimensional to three-dimensional space, resulting in a more realistic and clear perception experience.

3D structured light technology can be used for three-dimensional space restoration. After a specific laser information is projected onto a surface of an object, the optical information is collected by a camera, and the position and depth of the object are calculated according to the change of the optical information caused by the object, thereby restoring the entire three-dimensional space. The specific laser information is a very important indicator in the 3D structured light technology. Therefore, requirements for a collimating lens for projecting the laser information onto the surface of a to-be-measured object are very high. The collimating lens can be used for projecting lights with a specific solid angle emitted from a point light source array on a surface of a Vertical Cavity Surface Emitting Laser (VCSEL) to the surface of the to-be-measured object. The collimating lens is a key component of a 3D imaging quality.

In such products, as the ambient temperature changes, the focal length f of a lens changes greatly, which causes the angle of the projected light of the lens to change significantly. The change of the angle of the projected light of the lens changes the original optical information, which may result in errors in the calculation of the entire system and then affect a contour restoration accuracy of the three-dimensional object. Similarly, as the temperature changes, the imaging point of the collimating lens becomes larger, which may also cause the system to reduce the sharpness of the three-dimensional object. Therefore, it is important to make the angle of view and the size of the spot of the light information projected onto the to-be-measured object do not change greatly as the ambient temperature changes.

SUMMARY

The present disclosure aims to at least solve one of the technical problems existing in the related art. For this purpose, the object of the present disclosure is to provide a collimating lens with a stable focal length at different temperatures.

According to the collimating lens provided by the present disclosure, in order from a laser transmitter side to a to-be-measured object side, the collimating lens may include:

a first lens with positive refractive power, including a convex object side surface;

a second lens with negative refractive power, including a concave object side surface and a concave image side surface;

a third lens with positive refractive power;

a fourth lens with positive refractive power, including a convex image side surface;

an aperture stop on the to-be-measured object side;

optical centers of each lens being on a same line;

the collimating lens satisfying the following conditions:

$(dn/dt)1 < -50 \times 10^{-6}/°C.;$ $(dn/dt)2 < -50 \times 10^{-6}/°C.;$ $(dn/dt)3 < -50 \times 10^{-6}/°C.;$ $(dn/dt)4 > -10 \times 10^{-6}/°C.;$ wherein, $(dn/dt)1$ is a change rate of a refractive index of the first lens with temperature in a range of 0~60° C., $(dn/dt)2$ is a change rate of a refractive index of the second lens with temperature in a range of 0~60° C., $(dn/dt)3$ is a change rate of a refractive index of the third lens with temperature in a range of 0~60° C., and $(dn/dt)4$ is a change rate of a refractive index of the fourth lens with temperature in a range of 0~60° C.

According to the collimating lens provided by the present disclosure, due to the refractive index of each lens is distributed reasonably with temperature, an effect of the thermal expansion the lens itself and the structural components can be offset. So that the focal length can be stabilized and applied to different temperature. For every 10 degrees Celsius change in temperature, the effective focal length variation of the collimating lens is less than 0.0005 mm, so that the angle of the projected light of the lens is not change significantly, and the original optical information is not changed significantly. Compared with the related art, with the same size VCSEL (laser transmitter), the focal length of the system is larger, and the field of view angle is smaller, and the 3D structured light algorithm is more suitable to be applied.

Further, the collimating lens may satisfy the following condition:

$TTL/f < 1.0,$ wherein, TTL is a total length of the collimating lens, and f is a focal length of the collimating lens.

Further, an image side surface and an object side surface of the first lens, the second lens, the third lens, and the fourth lens are aspherical surfaces.

Further, the collimating lens may satisfy the following condition:

$0 < f4/f1 < 5.0,$ wherein, f4 is a focal length of the fourth lens, and f1 is a focal length of the first lens.

Further, the collimating lens may satisfy the following condition:

$-6.0 < f/R8 < 0,$ wherein, f is a focal length of the collimating lens, and R8 is a radius of curvature of the image side surface of the fourth lens.

Further, the collimating lens may satisfy the following condition:

−5.0<R1/R8<0, wherein, R1 is a radius of curvature of the object side surface of the first lens, and R8 is a radius of curvature of the image side surface of the fourth lens.

Further, the collimating lens may satisfy the following condition:

1.0<CT4/CT2<5.0, wherein, CT2 is a center thickness of the second lens, and CT4 is a center thickness of the fourth lens.

Further, a total length of the collimating lens is less than 3.5 mm.

Further, a focal length of the collimating lens is greater than 4.45 mm.

Further, a shape of the aspherical surface of each lens may satisfy the following condition:

$$z = \frac{ch^2}{1+\sqrt{1-(1+k)c^2h^2}} + Bh^4 + Ch^6 + Dh^8 + Eh^{10} + Fh^{12} + Gh^{14} + Hh^{16},$$

wherein, z is a vector height between a position on the aspheric surface and a vertex of the aspheric surface along an optical axis of the collimating lens, c is a curvature of the aspheric surface, k is a quadratic surface coefficient, h is a distance between the position and the optical axis, B is a fourth order surface coefficient, C is a sixth order surface coefficient, D is an eighth order surface coefficient, E is a tenth order surface coefficient, F is a twelve order surface coefficient, G is a fourteen order surface coefficient, H is a sixteen order surface coefficient.

The advantages of the disclosure will be set forth in part in the description of the following embodiments.

BRIEF DESCRIPTION OF THE DRAWINGS

The above and/or additional aspects and advantages of the present disclosure will be more straightforward.

FIG. 3a is a field curve diagram of the collimating lens according to a first embodiment of the present disclosure at 40° C. and 400 mm image distance. In FIG. 3a, the x-axis shows a field curvature value, the coordinate unit of the x-axis is millimeter, and the y-axis shows a field of view defined by an object height.

FIG. 3b is a distortion diagram of a collimating lens according to the first embodiment of the present disclosure at 40° C. and 400 mm image distance. In FIG. 3b, the x-axis shows a distortion value, the coordinate unit of the x-axis is percent, and the y-axis shows a field of view defined by the object height.

FIG. 6a is a field curve diagram of the collimating lens according to the second embodiment of the present disclosure at 40° C. and 400 mm image distance. In FIG. 6a, the x-axis shows a field curvature value, the coordinate unit of the x-axis is millimeters, and the y-axis shows a field of view defined by the object height.

FIG. 6b is a distortion diagram of the collimating lens according to the second embodiment of the present disclosure at 40° C. and 400 mm image distance. In FIG. 6b, the x-axis shows a distortion value, the coordinate unit of the x-axis is percent, and the y-axis shows a field of view defined by the object height.

FIG. 9a is a field curve diagram of the collimating lens according to the third embodiment of the present disclosure at 40° C. and 400 mm image distance. In FIG. 9a, the x-axis shows a field curvature value, the coordinate unit of the x-axis is millimeters, and the y-axis shows a field of view defined by the object height.

FIG. 9b is a distortion diagram of the collimating lens according to the third embodiment of the present disclosure at 40° C. and 400 mm image distance. In FIG. 9b, the x-axis shows a distortion value, the coordinate unit of the x-axis is percent, and the y-axis shows a field of view defined by the object height.

FIG. 12a is a field curve diagram of the collimating lens according to the fourth embodiment of the present disclosure at 40° C. and 400 mm image distance. In FIG. 12a, the x-axis shows a field curvature value, a coordinate unit of the x-axis is millimeter, and the y-axis shows a field of view defined by the object height.

FIG. 12b is a distortion diagram of the collimating lens according to the fourth embodiment of the present disclosure at 40° C. and 400 mm image distance. In FIG. 12b, an x-axis shows a distortion value, the coordinate unit of the x-axis is percent, and a y-axis shows a field of view defined by the object height.

DETAILED DESCRIPTION OF PREFERRED EMBODIMENTS

The specific embodiments of the present disclosure are described in detail below with reference to the accompanying drawings. Several embodiments of the disclosure are presented in the drawings. However, the disclosure may be embodied in many different forms and is not limited to the embodiments described herein. Rather, these embodiments are provided so that this disclosure will be thorough and comprehensive.

Unless otherwise defined, all technical and scientific terms used herein have the same meaning, the terminology used in the description of the present disclosure is for the purpose of describing particular embodiments and is not intended to limit the disclosure. The term "and/or" used herein includes any and all combinations of one or more of the associated listed items.

Figure 1:
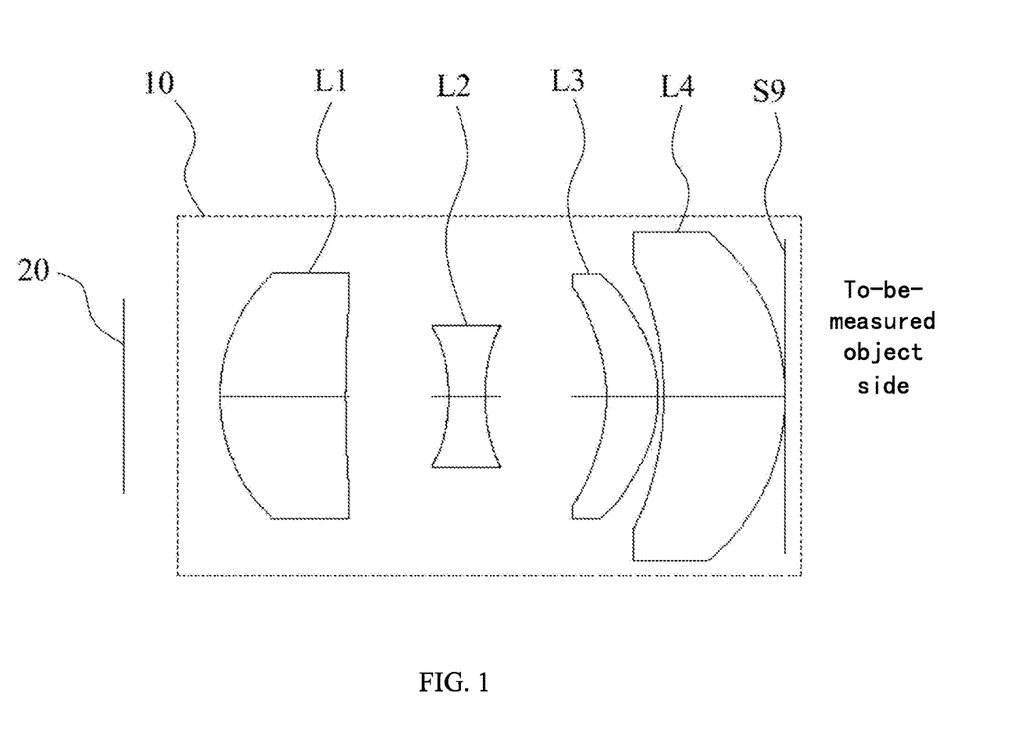
FIG. 1 is a schematic cross-sectional view of a collimating lens according to an embodiment of the present disclosure.
Figure 2:
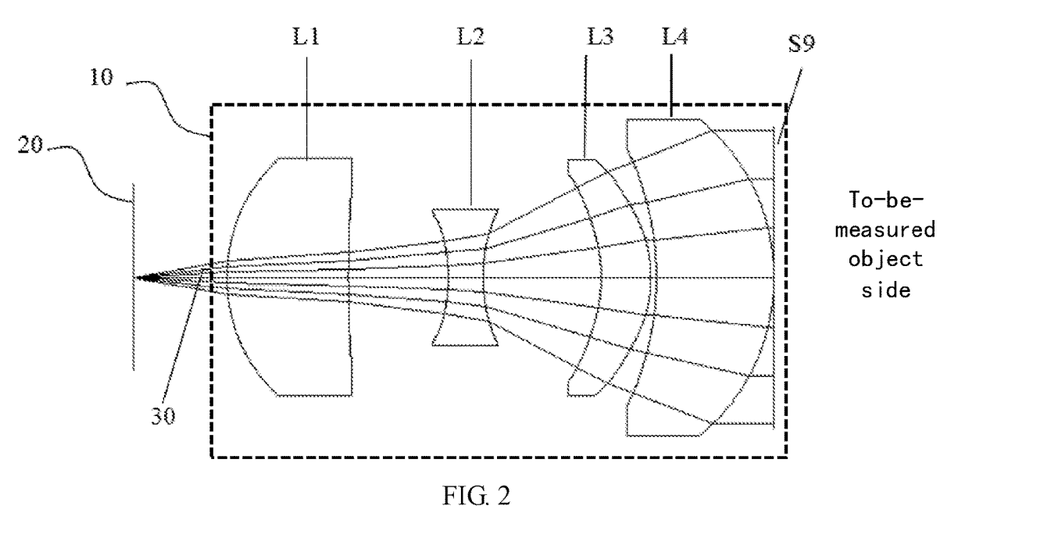
FIG. 2 is a schematic cross-sectional view of the collimating lens of FIG. 1, illustrating optical path of lasers emitted from a laser emitter.
Figure 3A:
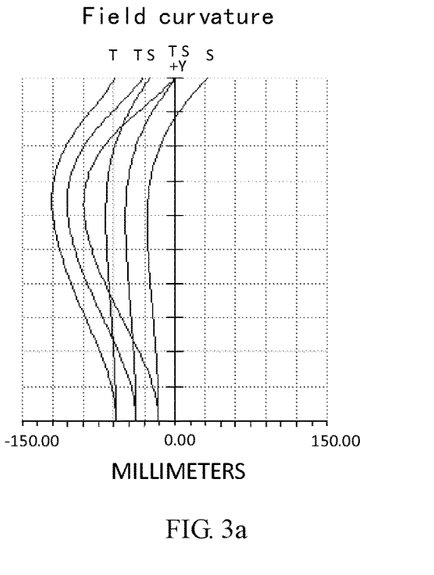
Figure 3B:
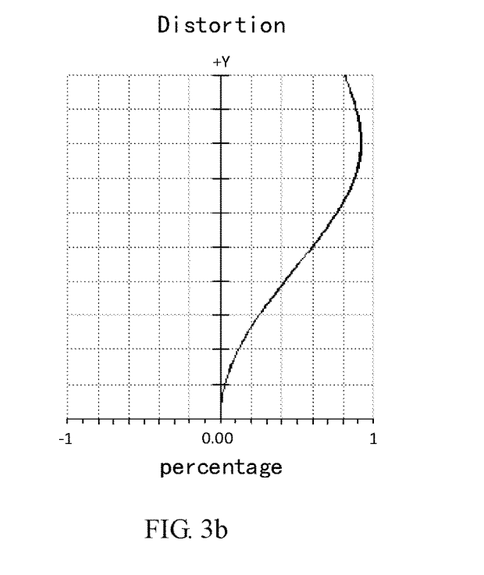
Figure 4:
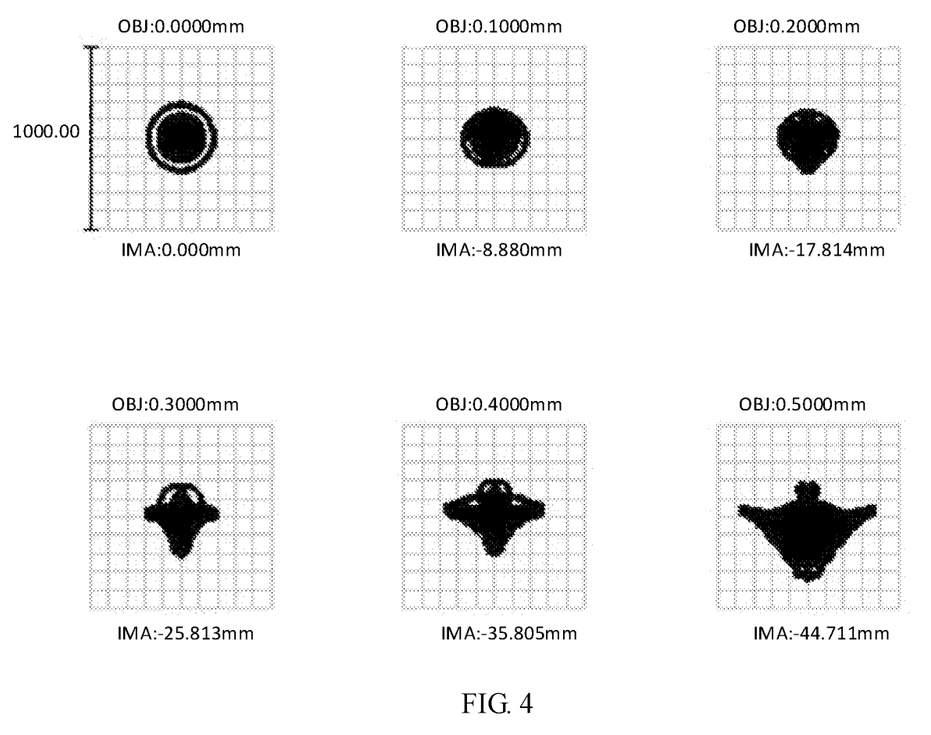
FIG. 4 is a schematic view showing the size and shape of an imaging point of the collimating lens according to the first embodiment of the present disclosure at 40° C. and 400 mm image distance, the unit of size is micrometers.
Figure 5:
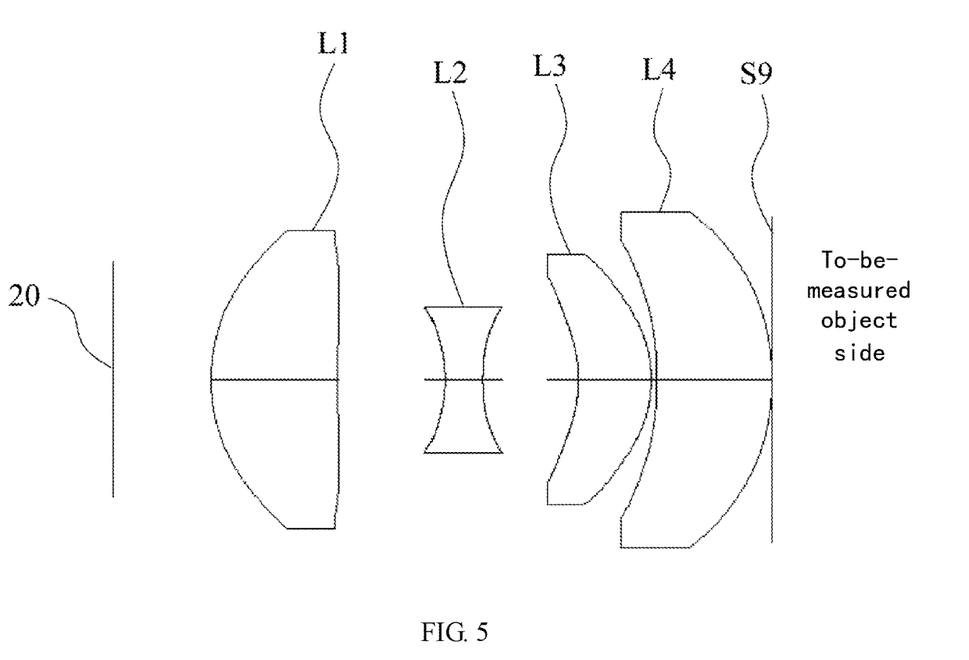
FIG. 5 is a cross-sectional view of the collimating lens according to a second embodiment of the present disclosure.
Figure 6A:
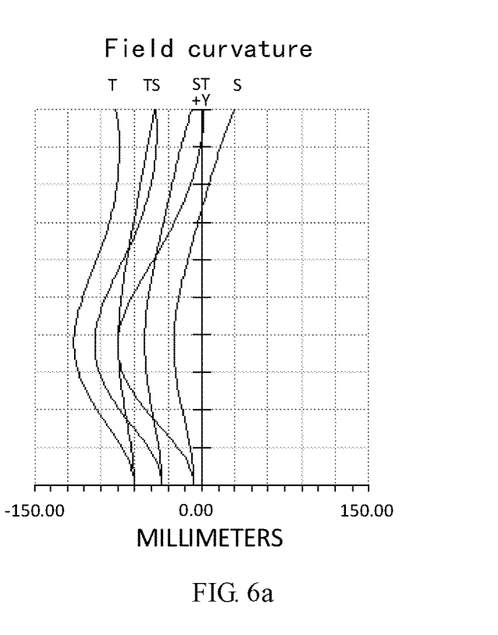
Figure 6B:
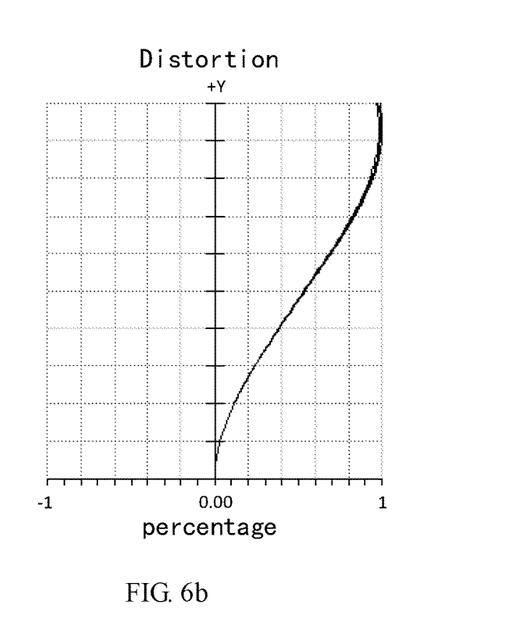
Figure 7:
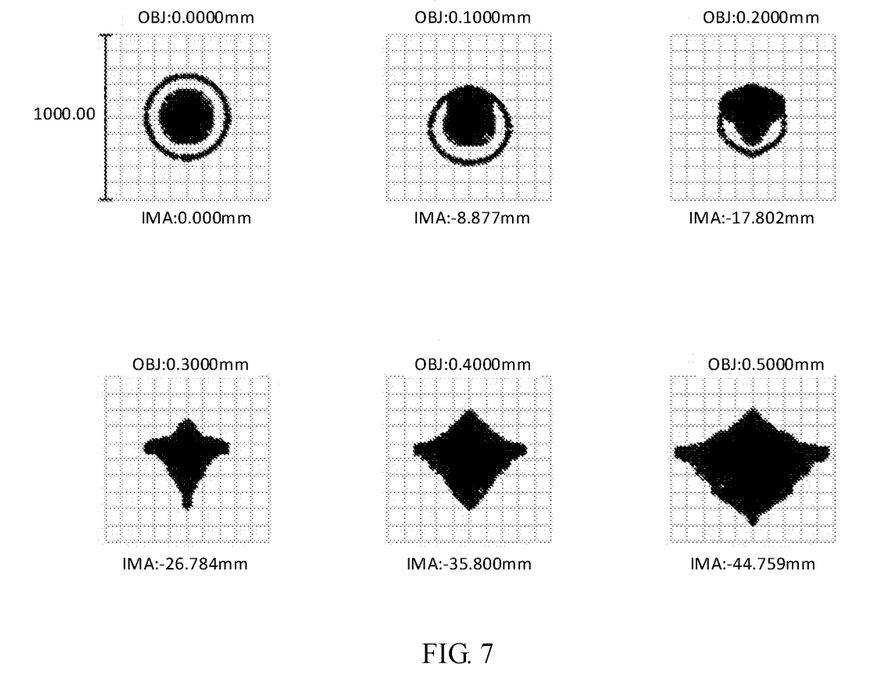
FIG. 7 is a schematic view showing the size and shape of an imaging point of the collimating lens according to the second embodiment of the present disclosure at 40° C. and 400 mm image distance, the unit of the size is micrometers.
Figure 8:
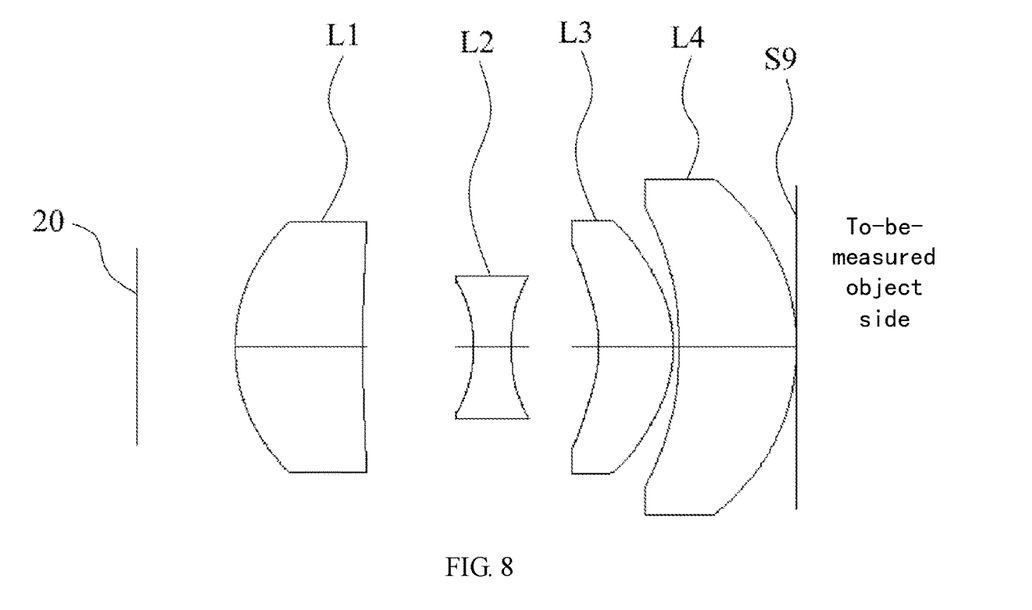
FIG. 8 is a cross-sectional view of the collimating lens according to a third embodiment of the present disclosure.
Figure 9A:
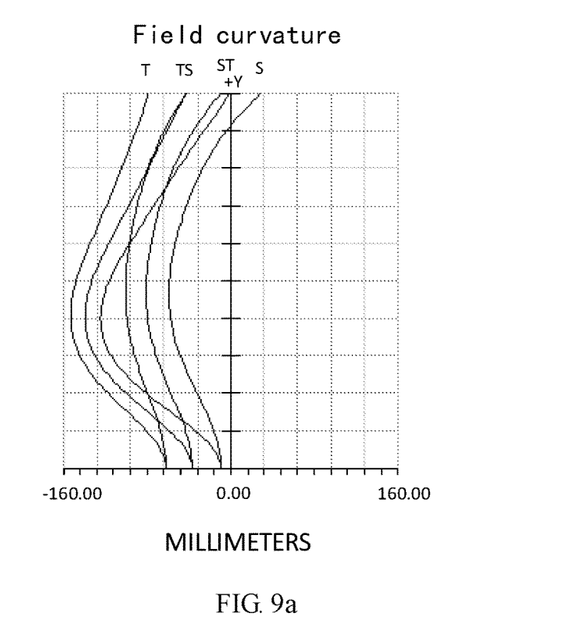
Figure 9B:
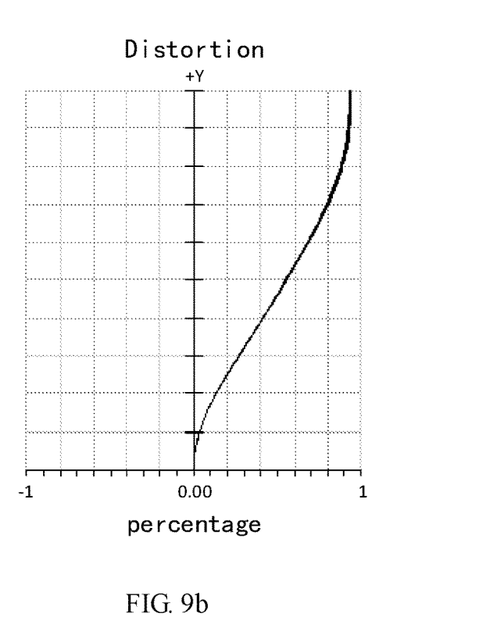
Figure 10:
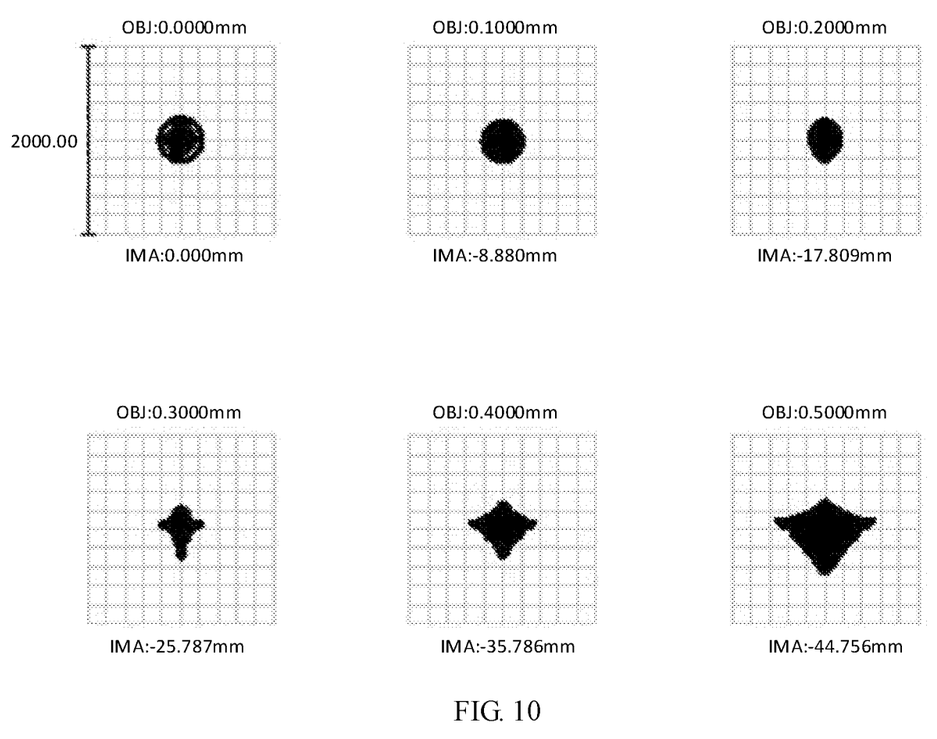
FIG. 10 is a schematic view showing the size and shape of an imaging point of the collimating lens according to the third embodiment of the present disclosure at 40° C. and 400 mm image distance, the unit of size is micrometers.
Figure 11:
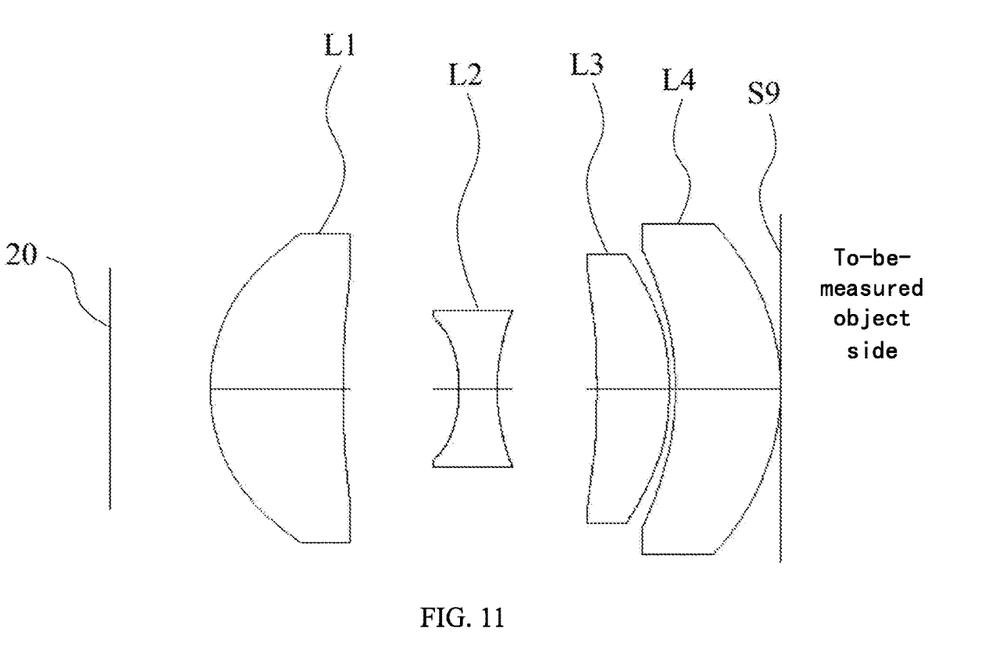
FIG. 11 is a cross-sectional view of the collimating lens according to a fourth embodiment of the present disclosure.
Figure 12A:
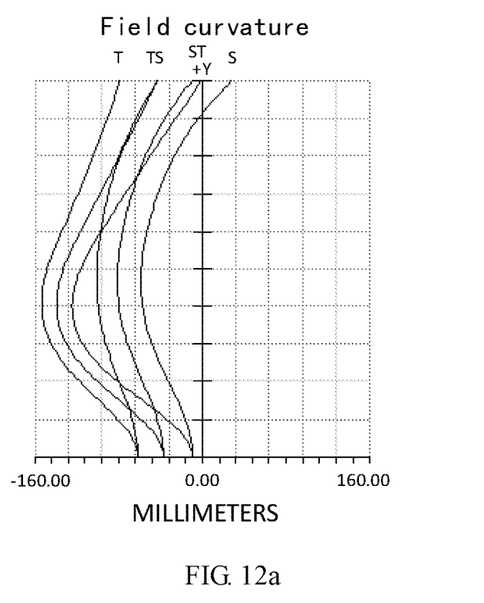
Figure 12B:
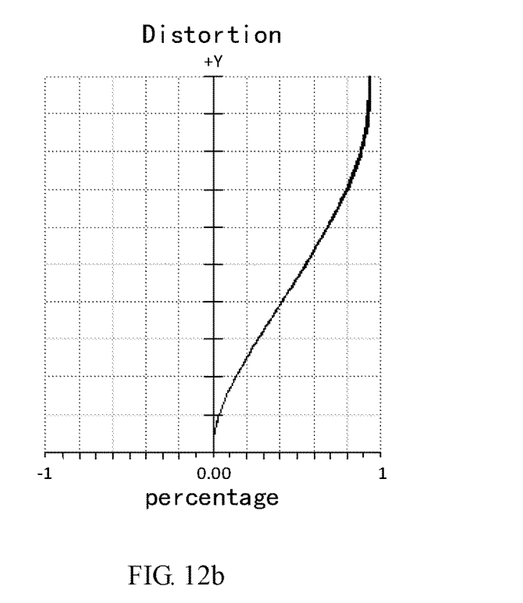
Figure 13:
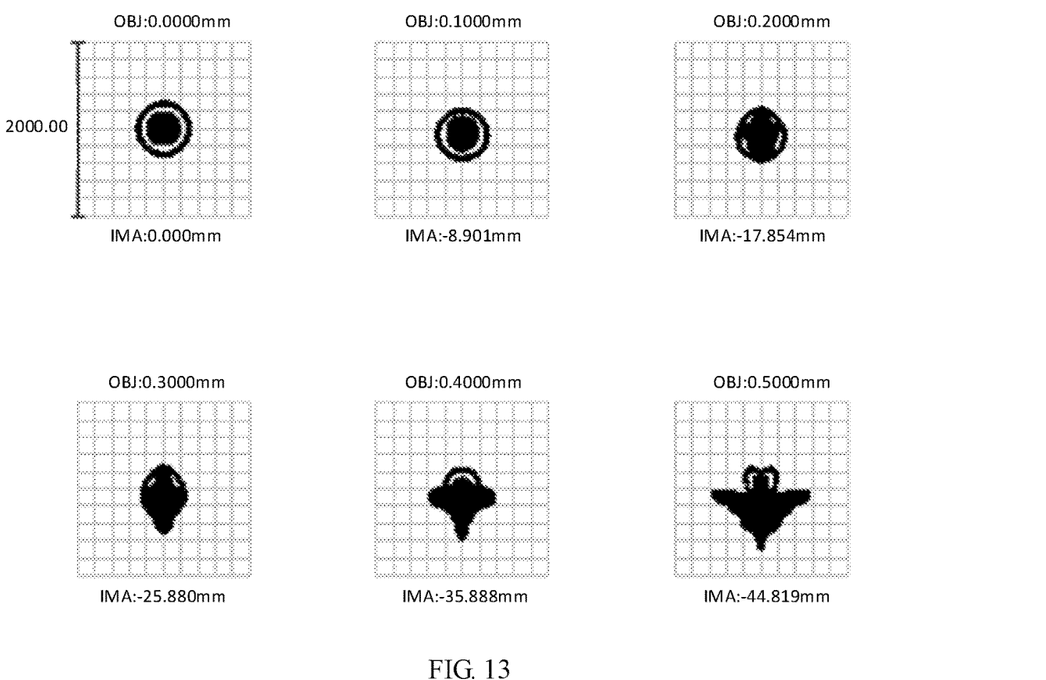
FIG. 13 is a schematic view showing the size and shape of an imaging point of the collimating lens according to the fourth embodiment of the present disclosure at 40° C. and 400 mm image distance, the unit of size is micrometers.

Referring to FIG. 1 and FIG. 2, a collimating lens 10 according to an embodiment of the present disclosure may include a first lens L1, a second lens L2, a third lens L3, a fourth lens L4 and an aperture stop S9. The first lens L1 has positive refractive power and is close to a laser emitter 20 (i.e. an object side). The second lens L2 has negative refractive power. The third lens L3 has positive refractive power. The fourth lens L4 has positive refractive power. The aperture stop S9 is close to a to-be-measured object side (i.e. an image side). Optical centers of each lens is on a same line.

The first lens L1 has positive refractive power and a convex image side surface. Both an image side surface and an object side surface of the first lens are aspherical surfaces, thereby a telecentric beam from the laser emitter 20 being converged. The first lens L1 provides sufficient positive power and can effectively control an overall volume of the optical lens unit.

The second lens L2 has a negative refractive power. Both an image side surface and an object side surface of the second lens L2 are concave aspherical surfaces. An aberration generated by the first lens L1 can be effectively reconciled, and a focusing ability of the working band can be controlled.

The third lens L3 has a positive refractive power. Both an image side surface and an object side surface of the third lens L3 are aspherical surfaces.

The fourth lens L4 has a positive refractive power and a convex image side surface. Both an image side surface and an object side surface of the fourth lens L4 are aspherical surfaces. An aberration of the optical lens can be effectively corrected, thereby an emitting angle of the light can be effectively controlled.

The collimating lens 10 provided by the present embodiment may satisfy the following condition:

$(dn/dt)1 < -50 \times 10^{-6} /° C.,$ $(dn/dt)2 < -50 \times 10^{-6} /° C.,$ $(dn/dt)3 < -50 \times 10^{-6} /° C.,$ $(dn/dt)4 > -10 \times 10^{-6} /° C.$ Wherein, $(dn/dt)1$ is a change rate of a refractive index of the first lens with temperature in a range of 0~60° C., $(dn/dt)2$ is a change rate of a refractive index of the second lens with temperature in a range of 0~60° C., $(dn/dt)3$ is a change rate of a refractive index of the third lens with temperature in a range of 0~60° C., and $(dn/dt)4$ is a change rate of a refractive index of the fourth lens with temperature in a range of 0~60° C.

In the above collimating lens, due to the refractive index of each lens is distributed reasonably with temperature, an effect can be offset by the influence of the thermal expansion focal length of the lens itself and the structural components can be offset. So that the focal length can be stabilized and applied to different temperature. For every 10 degrees Celsius change in temperature, the effective focal length variation of the collimating lens is less than 0.0005 mm, so that the angle of the projected light of the lens is not change significantly, and the original optical information is not changed significantly. Compared with the related art, with the same size VCSEL (laser transmitter), the focal length of the system is larger, and the field of view angle is smaller, and the 3D structured light algorithm is more suitable to be applied.

In the above collimating lens 10, the first lens L1, the second lens L2, and the third lens L3 are made of plastic, so that production costs can be effectively reduced. The fourth lens L4 is made of glass. So that the fourth lens L4 can ensure a system resolution does not change significantly with the change of working temperature.

Further, a total length TTL of the collimating lens 10 and a focal length f of the collimating lens 10 may satisfy a condition: TTL/f<1.0. The condition limits the proportional relationship between the total length of the collimating lens and the focal length of the collimating lens, and can achieve a purpose of system miniaturization in the case of a long focal length of the collimating lens. Specifically, the total length TTL of the collimating lens 10 is less than 3.5 mm, and the focal length f of the collimating lens 10 is greater than 4.45 mm, to achieve a better optical characteristics can be ensured, and be more suitable for 3D structured light algorithm implementation.

The object side surface and the image side surface of the first lens L1, the second lens L2, the third lens L3, and the fourth lens L4 are aspherical surfaces. That is, the object side surface and the image side surface of the first lens L1, the second lens L2, the third lens L3, and the fourth lens L4 are formed into a shape other than a spherical surface, thereby more control variables can be obtained to reduce aberrations.

In the optical lens group of the present disclosure, the first lens L1, the second lens L2, the third lenses L3 and the fourth lens L4 are four sheets of non-adhesive independent lenses. In other words, in the optical lens group of the present disclosure, each adjacent two lenses of the first lens L1, the second lens L2, the third lenses L3 and the fourth lens L4 define a gap. Because of processes of bonding the lenses are more complicated than processes of the non-adhesive lens, especially the bonding faces of the two lenses required to have a high precision surface, and the precise surface is used to achieve good adhesion when the two lenses are bonded. In the bonding process, the adhesion may be insufficient due to the offset, thereby affecting the optical imaging quality. Therefore, in the optical lens group of the present disclosure, the first lens L1, the second lens L2, the third lenses L3 and the fourth lens L4 are four non-adhesive independent lenses, in order to effectively improve the problems caused by the adhesive lens.

The ratio of the focal length f4 of the fourth lens L4 to the focal length f1 of the first lens L1 may satisfy:

$0 < f4/f1 < 5.0.$

This condition of f4 and f1 limits the ratio of the focal lengths of the first lens L1 and the focal lengths of the fourth lens L4. The condition of f4 and f1 is mainly used to condense the light passing through the first lens L1 on the imaging surface, and reduce an aberration of the collimating lens 10.

The ratio of the focal length f of the collimating lens 10 to the radius of curvature R8 of the image side surface of the fourth lens L4 may satisfy:

$-6.0 < f/R8 < 0.$

This condition of f and R8 limits the shape of the image side of the fourth lens L4. The condition of f and R8 is beneficial to the manufacturing of the lens and reduce the tolerance sensitivity.

The ratio of the radius of curvature R1 of the object side surface of the first lens L1 to the radius of curvature R8 of the image side surface of the fourth lens L4 may satisfy:

−5.0<R1/R8<0.

This condition of R1 and R8 restricts the opposite direction of the object side surface of the first lens L1 from the image side surface of the fourth lens L4, is mainly used to condense light passing through the first lens L1 on the imaging surface and reduce the image of the collimating lens 10.

The ratio of the center thickness CT4 of the fourth lens L4 to the center thickness CT2 of the second lens L2 may satisfy:

1.0<CT4/CT2<5.0.

This condition of CT4 and CT2 limits the ratio of the center thickness CT4 of the fourth lens L4 to the center thickness CT2 of the second lens L2. The condition of CT4 and CT2 is beneficial to processing and of the optical lens group by appropriately arranging the center thickness of the lens.

In summary, the collimating lens 10 is smaller in size, capable of achieving stable focal length and suitable for different temperature applications. The refractive index of each lens is distributed reasonably with the change rate of temperature and the coefficient of thermal expansion, therefore, the angle of the projecting light of the lens does not change significantly, and the original optical information is not changed significantly. With the same size VCSEL (laser transmitter), the focal length of the system is larger, the field of view angle is smaller, and the 3D structured light algorithm is more suitable to be applied.

The disclosure is further illustrated by the following various examples. In each of the following embodiments, the thickness and the radius of curvature of each lens in the collimating lens are different. For specific differences, refer to the parameter table in each embodiment. The following embodiments are merely preferred embodiments of the present disclosure, however the embodiments of the present disclosure are not limited by the following embodiments. Any other changes, substitutions, combinations or simplifications made without departing from the innovation of the disclosure are considered to be equivalent replacements and are included in the scope of the present disclosure.

In various embodiments of the disclosure, a shape of the aspherical surface of each lens may satisfy the following equation:

$$z = \frac{ch^2}{1 + \sqrt{1 - (1+k)c^2h^2}} + Bh^4 + Ch^6 + Dh^8 + Eh^{10} + Fh^{12} + Gh^{14} + Hh^{16}.$$

Wherein, z is a vector height between a position on the aspheric surface and a vertex of the aspheric surface along an optical axis of the collimating lens, c is a curvature of the aspheric surface, k is a quadratic surface coefficient, h is a distance between the position and the optical axis, B is a fourth order surface coefficient, C is a sixth order surface coefficient, D is an eighth order surface coefficient, E is a tenth order surface coefficient, F is a twelve order surface coefficient, G is a fourteen order surface coefficient, H is a sixteen order surface coefficient, z is a distance of the surface away from the vertex of the surface in the direction of the optical axis, c.

The First Embodiment

The structural diagram of the collimating lens of this embodiment is as shown in FIG. 1, FIG. 3a, FIG. 3b and FIG. 4. Related parameters of each lens in the collimating lens are shown in Table 1-1.

TABLE 1-1

| Surface No. | | Surface type | Radius of curvature | Thickness | Refractive index | Abbe number |
|---|---|---|---|---|---|---|
| 1 | Object | Spherical surface | — | 0.5 | | |
| 2 | The first lens L1 | Aspheric surface | 0.893515 | 0.650184 | 1.642324 | 23.52887 |
| 3 | | Aspheric surface | 7.963982 | 0.531322 | | |
| 4 | The second lens L2 | Aspheric surface | −0.97322 | 0.189816 | 1.664729 | 20.3729 |
| 5 | | Aspheric surface | 1.051732 | 0.628158 | | |
| 6 | The third lens L3 | Aspheric surface | −0.83641 | 0.264566 | 1.544232 | 55.9512 |
| 7 | | Aspheric surface | −0.83005 | 0.029143 | | |
| 8 | The fouth lens L4 | Aspheric surface | −2.34498 | 0.6297 | 1.771185 | 49.6466 |
| 9 | | Aspheric surface | −1.16377 | 0 | | |
| 10 | The aperture stop S9 | Spherical surface | — | 400 | | |
| 11 | The image surface | Spherical surface | — | | | |

The parameters of the aspheric surfaces of the lenses of this embodiment are shown in Table 1-2.

TABLE 1-2

| Surface No. | k | B | C | D | E | F | G | H |
|---|---|---|---|---|---|---|---|---|
| 2 | −5.9806E−01 | 2.4670E−01 | −3.6128E−02 | −9.5635E−01 | 3.4571E+00 | −3.6180E+00 | 0.0000E+00 | 0.0000E+00 |
| 3 | 0.0000E+00 | 1.2673E−01 | −3.8547E−01 | −1.0028E−01 | −8.6559E−01 | 1.3321E+00 | 0.0000E+00 | 0.0000E+00 |
| 4 | 0.0000E+00 | 5.2441E−02 | −1.3437E+01 | 3.2362E+01 | −1.7643E+02 | 1.1942E+03 | 0.0000E+00 | 0.0000E+00 |
| 5 | −3.0146E+01 | 4.5514E+00 | −3.4276E+01 | 1.9709E+02 | −8.0858E+02 | 2.0297E+03 | 0.0000E+00 | 0.0000E+00 |
| 6 | 7.7890E−01 | 7.5975E−01 | −7.3392E+00 | 8.5267E+01 | −3.2517E+02 | 4.1883E+02 | 0.0000E+00 | 0.0000E+00 |
| 7 | 0.0000E+00 | −1.5749E+00 | 6.4769E+00 | 1.0343E+01 | −7.6018E+01 | 8.4359E+01 | 0.0000E+00 | 0.0000E+00 |
| 8 | 0.0000E+00 | −1.5030E+00 | 8.6497E+00 | −2.3193E+01 | 2.9084E+01 | −1.4324E+01 | 0.0000E+00 | 0.0000E+00 |
| 9 | 0.0000E+00 | −7.2707E−02 | 1.0365E−01 | −2.3892E−01 | 3.3942E−01 | −2.1984E−01 | 0.0000E+00 | 0.0000E+00 |

The Second Embodiment

As illustrated in FIG. 5, FIG. 6a, FIG. 6b and FIG. 7, the collimating lens is provided in the second embodiment of the present disclosure. The relevant parameters of each lens in the collimating lens are shown in Table 2-1.

TABLE 2-1

| Surface No. | | Surface type | Radius of curvature | Thickness | Refractive index | Abbe number |
|---|---|---|---|---|---|---|
| 1 | Object | Spherical surface | — | 0.5 | | |
| 2 | The first lens L1 | Aspheric surface | 0.935094 | 0.6389 | 1.653986 | 21.5136 |
| 3 | | Aspheric surface | 195.3101 | 0.542545 | | |
| 4 | The second lens L2 | Aspheric surface | −0.71299 | 0.189697 | 1.664729 | 20.3729 |
| 5 | | Aspheric surface | 1.179587 | 0.483611 | | |
| 6 | The third lens L3 | Aspheric surface | −0.66114 | 0.365175 | 1.544232 | 55.9512 |
| 7 | | Aspheric surface | −0.72684 | 0.028991 | | |
| 8 | The fourth lens L4 | Aspheric surface | −2.48606 | 0.584096 | 1.809608 | 40.8881 |
| 9 | | Aspheric surface | −1.21201 | 0 | | |
| 10 | The aperture stop S9 | Spherical surface | — | 400 | | |
| 11 | The image surface | Spherical surface | — | — | | |

The parameters of the aspheric surfaces of the lenses of this embodiment are shown in Table 2-2.

TABLE 2-2

| Surface No. | k | B | C | D | E | F | G | H |
|---|---|---|---|---|---|---|---|---|
| 2 | −5.9098E−01 | 1.9886E−01 | 3.2176E−01 | −1.6560E+00 | 3.6439E+00 | −3.3775E+00 | 4.1896E−05 | −7.0146E−05 |
| 3 | 0.0000E+00 | 1.5121E−01 | −3.8050E−01 | −1.6409E−01 | −4.8524E−01 | 9.1126E−01 | 3.0049E−05 | 2.5972E−04 |
| 4 | 0.0000E+00 | 2.0932E+00 | −2.8083E+01 | 6.1729E+01 | −2.1330E+00 | 7.3732E+02 | 0.0000E+00 | 0.0000E+00 |
| 5 | −6.3411E+01 | 7.5769E+00 | −5.1731E+01 | 1.8328E+02 | −1.8682E+02 | 1.7301E+01 | 0.0000E+00 | 0.0000E+00 |
| 6 | 2.3619E−01 | 1.3336E+00 | −2.9335E+00 | 6.5225E+01 | −3.2673E+02 | 5.2705E+02 | 0.0000E+00 | 0.0000E+00 |
| 7 | 0.0000E+00 | −1.4676E+00 | 6.6833E+00 | 6.6315E+00 | −5.7358E+01 | 6.3588E+01 | −1.7097E−03 | 1.1390E−03 |
| 8 | 0.0000E+00 | −1.6034E+00 | 7.6646E+00 | −1.8246E+01 | 2.0951E+01 | −9.6403E+00 | 3.0240E−05 | −2.8410E−04 |
| 9 | 0.0000E+00 | −1.5756E−01 | 1.5321E−01 | −2.7306E−01 | 3.4838E−01 | −2.2197E−01 | 1.1888E−04 | 6.4693E−05 |

The Third Embodiment

As illustrated in FIG. 8, FIG. 9a, FIG. 9b and FIG. 10, the collimating lens is provided in the third embodiment of the present disclosure. The relevant parameters of each lens in the collimating lens are shown in Table 3-1.

TABLE 3-1

| Surface No. | | Surface type | Radius of curvature | Thickness | Refractive index | Abbe number |
|---|---|---|---|---|---|---|
| 1 | Object | Spherical surface | — | 0.5 | | |
| 2 | The first lens L1 | Aspheric surface | 0.910777 | 0.6426 | 1.664729 | 20.3729 |
| 3 | | Aspheric surface | 11.79765 | 0.560839 | | |
| 4 | The second lens L2 | Aspheric surface | −0.67592 | 0.189893 | 1.664729 | 20.3729 |
| 5 | | Aspheric surface | 1.346678 | 0.441053 | | |
| 6 | The third lens L3 | Aspheric surface | −0.68638 | 0.373631 | 1.544232 | 55.9512 |
| 7 | | Aspheric surface | −0.813 | 0.029801 | | |
| 8 | The fourth lens L4 | Aspheric surface | −2.7517 | 0.593549 | 1.809608 | 40.8881 |
| 9 | | Aspheric surface | −1.17382 | 0 | | |
| 10 | The aperture stop S9 | Spherical surface | — | 400 | | |
| 11 | The image surface | Spherical surface | — | — | | |

The parameters of the aspheric surfaces of the lenses of this embodiment are shown in Table 3-2.

TABLE 3-2

| Surface No. | k | B | C | D | E | F | G | H |
|---|---|---|---|---|---|---|---|---|
| 2 | −6.4410E−01 | 2.1998E−01 | 2.8928E−01 | −1.5601E+00 | 3.5315E+00 | −3.4775E+00 | 8.0743E−01 | −1.5194E+00 |
| 3 | 0.0000E+00 | 2.1533E−01 | −4.3610E−01 | −6.8125E−01 | −6.2920E−01 | 2.3179E+00 | 1.1910E+00 | −3.0391E+00 |
| 4 | 0.0000E+00 | 2.5221E+00 | −2.7029E+01 | −4.6114E+01 | 6.5141E+02 | −6.1090E+00 | 0.0000E+00 | 0.0000E+00 |
| 5 | −1.0928E+02 | 8.5181E+00 | −6.0955E+01 | 1.9405E+02 | −4.2544E+01 | −3.2126E+02 | 0.0000E+00 | 0.0000E+00 |

TABLE 3-2-continued

| Surface No. | k | B | C | D | E | F | G | H |
|---|---|---|---|---|---|---|---|---|
| 6 | 3.5121E−01 | 1.7118E+00 | −3.1953E+00 | 6.5273E+01 | −3.5599E+02 | 6.0069E+02 | 0.0000E+00 | 0.0000E+00 |
| 7 | 0.0000E+00 | −1.3904E+00 | 6.2159E+00 | 6.6647E+00 | −6.3578E+01 | 7.7362E+01 | 1.1614E+01 | −4.4543E+01 |
| 8 | 0.0000E+00 | −1.5417E+00 | 7.3810E+00 | −1.8545E+01 | 2.2727E+01 | −1.0471E+01 | 2.2380E−02 | −4.7901E−01 |
| 9 | 0.0000E+00 | −1.3671E−01 | 1.6561E−01 | −3.3378E−01 | 3.4590E−01 | −1.3311E−01 | 3.7593E−02 | −4.8900E−03 |

The Fourth Embodiment

As illustrated in FIG. 11, FIG. 12a, FIG. 12b and FIG. 13, the collimating lens is provided in the fourth embodiment of the present disclosure. The relevant parameters of each lens in the collimating lens are shown in Table 4-1.

TABLE 4-1

| Surface No. | Surface type | | Radius of curvature | Thickness | Refractive index | Abbe number |
|---|---|---|---|---|---|---|
| 1 | Object | Spherical surface | — | 0.5 | | |
| 2 | The first lens L1 | Aspheric surface | 0.884706 | 0.662238 | 1.664729 | 20.3729 |
| 3 | | Aspheric surface | 4.901735 | 0.579146 | | |
| 4 | The second lens L2 | Aspheric surface | −0.89949 | 0.187289 | 1.664729 | 20.3729 |
| 5 | | Aspheric surface | 0.75967 | 0.49649 | | |
| 6 | The third lens L3 | Aspheric surface | −7.52462 | 0.358833 | 1.544232 | 55.9512 |
| 7 | | Aspheric surface | −1.93886 | 0.03184 | | |
| 8 | The fourth lens L4 | Aspheric surface | −1.75094 | 0.525584 | 2.022544 | 24.4119 |
| 9 | | Aspheric surface | −1.11948 | 0 | | |
| 10 | The aperture stop S9 | Spherical surface | — | 400 | | |
| 11 | The image surface | Spherical surface | — | — | | |

The parameters of the aspheric surfaces of the lenses of this embodiment are shown in Table 4-2.

TABLE 4-2

| Surface No. | k | B | C | D | E | F | G | H |
|---|---|---|---|---|---|---|---|---|
| 2 | −5.1558E−01 | 2.5604E−01 | −1.4258E−01 | 1.0876E−01 | 1.5782E−01 | 5.0022E−01 | 3.7933E−01 | −2.4701E+00 |
| 3 | −3.6661E+02 | 3.1068E−01 | −6.3783E−01 | 8.8748E−01 | 3.7000E+00 | −7.1327E+00 | 7.4533E+00 | |
| 4 | 1.3552E+00 | −5.4703E+00 | 5.0116E+01 | −4.4608E+02 | 1.5691E+03 | 0.0000E+00 | 0.0000E+00 | 0.0000E+00 |
| 5 | −1.5309E+01 | −2.5088E−01 | 1.6034E−01 | −1.1246E+02 | 3.0303E+02 | 0.0000E+00 | 0.0000E+00 | 0.0000E+00 |
| 6 | 1.3662E+02 | −3.5716E−01 | −4.7428E+00 | 5.4874E+01 | −2.3442E+02 | 5.4712E+02 | −7.1566E+02 | 4.3036E+02 |
| 7 | 6.0263E+00 | −1.8090E+00 | 6.4148E+00 | −4.2557E+00 | −2.4726E+01 | 7.4730E+01 | −9.0938E+01 | 5.1057E+01 |
| 8 | −6.3185E+00 | −9.7672E−01 | 4.4363E+00 | −9.8238E+00 | 1.0472E+01 | −1.0947E+01 | 2.1105E+01 | −1.7445E+01 |
| 9 | 0.0000E+00 | 4.4907E−02 | 1.1964E−01 | −3.6677E−01 | 4.4339E−01 | −5.0406E−02 | −3.9453E−01 | 3.3307E−01 |

The smaller the data range of the image point, the better the lens performance. The aberrations in each embodiment are well corrected as shown in FIG. 4, FIG. 7, FIG. 10 and FIG. 13.

Table 5 shows the above four embodiments and their corresponding optical characteristics. Table 5 includes the system focal length f, the numerical aperture stop NA, and the system optical total length TTL, and values corresponding to each of the preceding conditional expressions.

TABLE 5

| Condition | The first embodiment | The second embodiment | The third embodiment | The fourth embodiment |
|---|---|---|---|---|
| TTL(mm) | 3.4229 | 3.333 | 3.3314 | 3.3414 |
| f (mm) | 4.5001 | 4.4979 | 4.4991 | 4.4906 |
| NA | 0.175 | 0.175 | 0.175 | 0.175 |
| TTL/f | 0.761 | 0.741 | 0.740 | 0.744 |
| (dn/dt) 1 ($10^{-6}$/° C.) | −113 | −118 | −120 | −120 |
| (dn/dt) 2 ($10^{-6}$/° C.) | −120 | −120 | −120 | −120 |
| (dn/dt) 3 ($10^{-6}$/° C.) | −96 | −96 | −96 | −96 |
| (dn/dt) 4 ($10^{-6}$/° C.) | 3 | 7 | 7 | 21 |
| f4/f1 | 1.5782 | 1.662 | 1.4628 | 1.4092 |
| f/R8 | −3.8668 | −3.7111 | −3.8329 | −4.0114 |
| R1/R8 | −0.7678 | −0.7715 | −0.7759 | −0.7903 |
| CT4/CT2 | 3.3174 | 3.0791 | 3.1257 | 2.8063 |

In the description of the present specification, the description with reference to the terms "one embodiment", "some embodiments", "example", "specific example", or "some examples" and the like means a specific feature described in connection with the embodiment or example. A structure, material or feature is included in at least one embodiment or example of the disclosure. In the present specification, the schematic representation of the above terms does not necessarily refer to the same embodiment or example. Furthermore, particular features, structures, materials, or characteristics described may be combined in a suitable manner in any one or more embodiments or examples.

The above-mentioned embodiments are merely illustrative of several embodiments of the present disclosure, and the description thereof is more specific and detailed, however is not to be construed as limiting the scope of the disclosure. It should be noted that various variations and modifications may be made by those skilled in the art without departing from the spirit and scope of the disclosure. Therefore, the scope of the disclosure should be determined by the appended claims.

What is claimed is:

1. A collimating lens, in order from a laser transmitter side to a to-be-measured object side, comprising:
   a first lens with positive refractive power, comprising a convex object side surface;
   a second lens with negative refractive power, comprising a concave object side surface and a concave image side surface;
   a third lens with positive refractive power;
   a fourth lens with positive refractive power, comprising a convex image side surface;
   an aperture stop on the to-be-measured object side;
   optical centers of each lens being on a same line; and the collimating lens satisfying the following conditions:

$(dn/dt)1 < -50 \times 10^{-6}/° C.$, $(dn/dt)2 < -50 \times 10^{-6}/° C.$, $(dn/dt)3 < -50 \times 10^{-6}/° C.$, $(dn/dt)4 > -10 \times 10^{-6}/° C.$ wherein, $(dn/dt)1$ is a change rate of a refractive index of the first lens with temperature in a range of 0~60° C., $(dn/dt)2$ is a change rate of a refractive index of the second lens with temperature in a range of 0~60° C., $(dn/dt)3$ is a change rate of a refractive index of the third lens with temperature in a range of 0~60° C., and $(dn/dt)4$ is a change rate of a refractive index of the fourth lens with temperature in a range of 0~60° C.

2. The collimating lens as claimed in claim 1, wherein the collimating lens satisfies the following condition:

$TTL/f < 1.0$, wherein, TTL is a total length of the collimating lens, and f is a focal length of the collimating lens.

3. The collimating lens as claimed in claim 1, wherein an image side surface and an object side surface of the first lens, the second lens, the third lens, and the fourth lens are aspherical surfaces.

4. The collimating lens as claimed in claim 1, wherein the collimating lens satisfies the following condition:

$0 < f4/f1 < 5.0$, wherein, f4 is a focal length of the fourth lens, and f1 is a focal length of the first lens.

5. The collimating lens as claimed in claim 1, wherein the collimating lens satisfies the following condition:

$-6.0 < f/R8 < 0$, wherein, f is a focal length of the collimating lens, and R8 is a radius of curvature of the image side surface of the fourth lens.

6. The collimating lens as claimed in claim 1, wherein the collimating lens satisfies the following condition:

$-5.0 < R1/R8 < 0$, wherein, R1 is a radius of curvature of the object side surface of the first lens, and R8 is a radius of curvature of the image side surface of the fourth lens.

7. The collimating lens as claimed in claim 1, wherein the collimating lens satisfies the following condition:

$1.0 < CT4/CT2 < 5.0$, wherein, CT2 is a center thickness of the second lens, and CT4 is a center thickness of the fourth lens.

8. The collimating lens as claimed in claim 1, wherein a total length of the collimating lens is less than 3.5 mm.

9. The collimating lens as claimed in claim 1, wherein a focal length of the collimating lens is greater than 4.45 mm.

10. The collimating lens as claimed in claim 1, wherein a shape of the aspherical surface of each lens satisfies the following condition:

$$z = \frac{ch^2}{1 + \sqrt{1 - (1+k)c^2h^2}} + Bh^4 + Ch^6 + Dh^8 + Eh^{10} + Fh^{12} + Gh^{14} + Hh^{16}$$

wherein, z is a vector height between a position on the aspheric surface and a vertex of the aspheric surface along an optical axis of the collimating lens, c is a curvature of the aspheric surface, k is a quadratic surface coefficient, h is a distance between the position and the optical axis, B is a fourth order surface coefficient, C is a sixth order surface coefficient, D is an eighth order surface coefficient, E is a tenth order surface coefficient, F is a twelve order surface coefficient, G is a fourteen order surface coefficient, H is a sixteen order surface coefficient.

11. The collimating lens as claimed in claim 1, wherein the object side surface of the first lens is opposite to the image side surface of the fourth lens.

12. The collimating lens as claimed in claim 1, wherein the first lens, the second lens and the third lens are made of plastic.

13. The collimating lens as claimed in claim 1, wherein the fourth lens is made of glass.

14. The collimating lens as claimed in claim 1, wherein each adjacent two lenses define a gap.

15. The collimating lens as claimed in claim 1, wherein $(dn/dt)1$ is $-113 \times 10^{-6}/° C.$, $(dn/dt)2$ is $-120 \times 10^{-6}/° C.$, $(dn/dt)3$ is $-96 \times 10^{-6}/° C.$ and $(dn/dt)4$ is $3 \times 10^{-6}/° C.$ 16. The collimating lens as claimed in claim 1, wherein $(dn/dt)1$ is $-113 \times 10^{-6}/° C.$, $(dn/dt)2$ is $-120 \times 10^{-6}/° C.$, $(dn/dt)3$ is $-96 \times 10^{-6}/° C.$ and $(dn/dt)4$ is $3 \times 10^{-6}/° C.$ 17. The collimating lens as claimed in claim 1, wherein $(dn/dt)1$ is $-113 \times 10^{-6}/° C.$, $(dn/dt)2$ is $-120 \times 10^{-6}/° C.$, $(dn/dt)3$ is $-96 \times 10^{-6}/° C.$ and $(dn/dt)4$ is $3 \times 10^{-6}/° C.$ 18. The collimating lens as claimed in claim 1, wherein $(dn/dt)1$ is $-113 \times 10^{-6}/° C.$, $(dn/dt)2$ is $-120 \times 10^{-6}/° C.$, $(dn/dt)3$ is $-96 \times 10^{-6}/° C.$ and $(dn/dt)4$ is $3 \times 10^{-6}/° C.$

* * * * *

UNITED STATES PATENT AND TRADEMARK OFFICE
CERTIFICATE OF CORRECTION

PATENT NO. : 10,989,930 B2  
APPLICATION NO. : 16/326378  
DATED : April 27, 2021  
INVENTOR(S) : Xuming Liu et al.

Page 1 of 1

It is certified that error appears in the above-identified patent and that said Letters Patent is hereby corrected as shown below:

On the Title Page

Column 1, Assignee field, delete "JIANGXI LIANYI OPTICE CO., LTD." and insert --JIANGXI LIANYI OPTICS CO., LTD.--

Column 1, Assignee field, delete "Nanching (CN)" and insert --Nanchang (CN)-- immediately after the name of assignee.

Signed and Sealed this  
Tenth Day of August, 2021

Drew Hirshfeld  
*Performing the Functions and Duties of the*  
*Under Secretary of Commerce for Intellectual Property and*  
*Director of the United States Patent and Trademark Office*